(12) United States Patent
Uluderya et al.

(10) Patent No.: US 8,539,080 B1
(45) Date of Patent: Sep. 17, 2013

(54) APPLICATION INTELLIGENT REQUEST MANAGEMENT BASED ON SERVER HEALTH AND CLIENT INFORMATION

(71) Applicant: Microsoft Corporation, Redmond, WA (US)

(72) Inventors: Gokhan Uluderya, Redmond, WA (US); Tyler Furtwangler, Seattle, WA (US); Bijul Soni, Redmond, WA (US); Eric Fox, Seattle, WA (US); Sanjay Rama, Redmond, WA (US); Kfir Ami-ad, Redmond, WA (US); Roshane Silva, Seattle, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/719,147

(22) Filed: Dec. 18, 2012

(51) Int. Cl.
*G06F 13/00* (2006.01)
(52) U.S. Cl.
USPC .............................. 709/226; 709/225; 709/229
(58) Field of Classification Search
USPC ................... 709/223, 225, 226, 227, 229, 238
See application file for complete search history.

(56) References Cited

U.S. PATENT DOCUMENTS

| | | | | |
|---|---|---|---|---|
| 7,287,084 | B1 * | 10/2007 | Masters | ......................... 709/229 |
| 7,990,847 | B1 | 8/2011 | Leroy et al. | |
| 8,180,922 | B2 * | 5/2012 | Dini et al. | ...................... 709/241 |
| 8,190,629 | B2 | 5/2012 | Wu et al. | |
| 8,209,415 | B2 | 6/2012 | Wei | |
| 2005/0021732 | A1 * | 1/2005 | Suffern et al. | ................. 709/224 |
| 2007/0143460 | A1 * | 6/2007 | Ben-David et al. | ............ 709/223 |
| 2011/0314119 | A1 * | 12/2011 | Kakadia et al. | ................ 709/213 |

OTHER PUBLICATIONS

"Application Request Routing", Retrieved at <<http://www.iis.net/downloads/microsoft/application-request-routing>>, Retrieved Date: Sep. 18, 2012, pp. 3.
"Request Management in SharePoint Server 2013 Preview, Part One: Feature Capability and Architecture Overview", Retrieved at <<http://www.harbar.net/articles/sp2013rm1.aspx>>, Jul. 27, 2012, pp. 6.
"WebSphere Application Server Network Deployment", Retrieved at <<http://www-01.ibm.com/software/webservers/appserv/was/network/>>, Jul. 17, 2012, pp. 4.
"Application Delivery Network—Wikipedia, the Free Encyclopedia", Retrieved at <<http://en.wikipedia.org/wiki/Application_delivery_network>>, Jul. 14, 2012, pp. 7.
"Global Server Load Balancing (GSLB)", Retrieved at <<http://www.a10networks.com/products/axseries-gslb.php>>, Retrieved Date: Sep. 18, 2012, pp. 3.
"Server Load Balancing in Today's Web-Enabled Enterprises", Retrieved at <<http://www.genesisglobalinc.com/PDF/foundry-server-load-bal-web-enterprise.pdf>>, In Foundry Networks White Paper, Apr. 2002, pp. 10.

\* cited by examiner

*Primary Examiner* — Viet Vu
(74) *Attorney, Agent, or Firm* — Turk IP Law, LLC (57) ABSTRACT

Requests to a server farm are managed in an application intelligent manner based on server health and client information. A request management (RM) module is configured to make smart routing decisions, based on routing rules that relate the nature of requests to a dynamic topology of a server infrastructure. The RM may use its knowledge of server applications, servers, and clients to deny potentially harmful requests from entering the service, route good requests to the suitable machines, and maintain a history of the decisions and consequences automatic and/or manual optimization.

18 Claims, 9 Drawing Sheets

APPLICATION INTELLIGENT REQUEST MANAGEMENT BASED ON SERVER HEALTH AND CLIENT INFORMATION

BACKGROUND

Modern data communication architectures involve commonly "server farms", a collective of servers that manage storage, processing, and exchange of data for a variety of purposes. Many services are increasingly provided as web applications, hosted applications that may be accessed by users through browsers or similar thin clients without burdening the users with local installations, updates, compatibility issues, etc. Thus, a server farm may include up to thousands of servers providing web applications for productivity, communications, data analysis, data storage, and comparable services. Client applications (thin or thick) interact with the hosted applications through "requests". For example, a word processing application provided as a web application may receive a request from a client application to open a document, find the document in a networked store, retrieve its contents, and render at the client application. Another example may be a "Save" request. When the user is done, they may select a "Save" control on the client application, which may send a save request to the web application resulting in updating of the stored document.

Because a number of servers may be involved with the web application, an incoming request needs to be directed to the proper server(s) such that the requested task can be completed. Request management is one of the management approaches that helps a server farm manage incoming requests by evaluating logic rules against the requests in order to determine which action to take, and which server or servers in the farm (if any) is to handle the requests.

Traditional load balancing and routing is typically based on static rules failing to take into account dynamic changes in servers, requests, network loads. Furthermore, with an increasing number of different services and versions of services being offered through server farms, managing different types of requests and different types of servers (dedicated, good health, bad health, tenant-specific, supporting different versions of applications, etc.) is a complex undertaking.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to application intelligent request management based on server health and client information. According to some embodiments, a request management (RM) module may make smart routing decisions, based on routing rules that relate the nature of requests to a dynamic topology of a server infrastructure. The RM may use its knowledge of server applications, servers, and clients to deny potentially harmful requests from entering the service, route good requests to the suitable machines, and maintain a history of the decisions and consequences automatic and/or manual optimization. The application, server, and client information may be provided to the RM by an administrator or collected through an automated mechanism.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a software and/or hardware based request management module may manage forwarding of requests to servers within a cloud service using server health and client information received in headers of service exchange communication periodically or on-demand and request communication from clients. Knowing what kind of client and what kind of request is generated, the request manager may be dynamically programmed to take that information into account through customizable rules or scripts.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable physical media.

Throughout this specification, the term "platform" may be a combination of software and hardware components for application intelligent request management based on server health and client information. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

Figure 1:
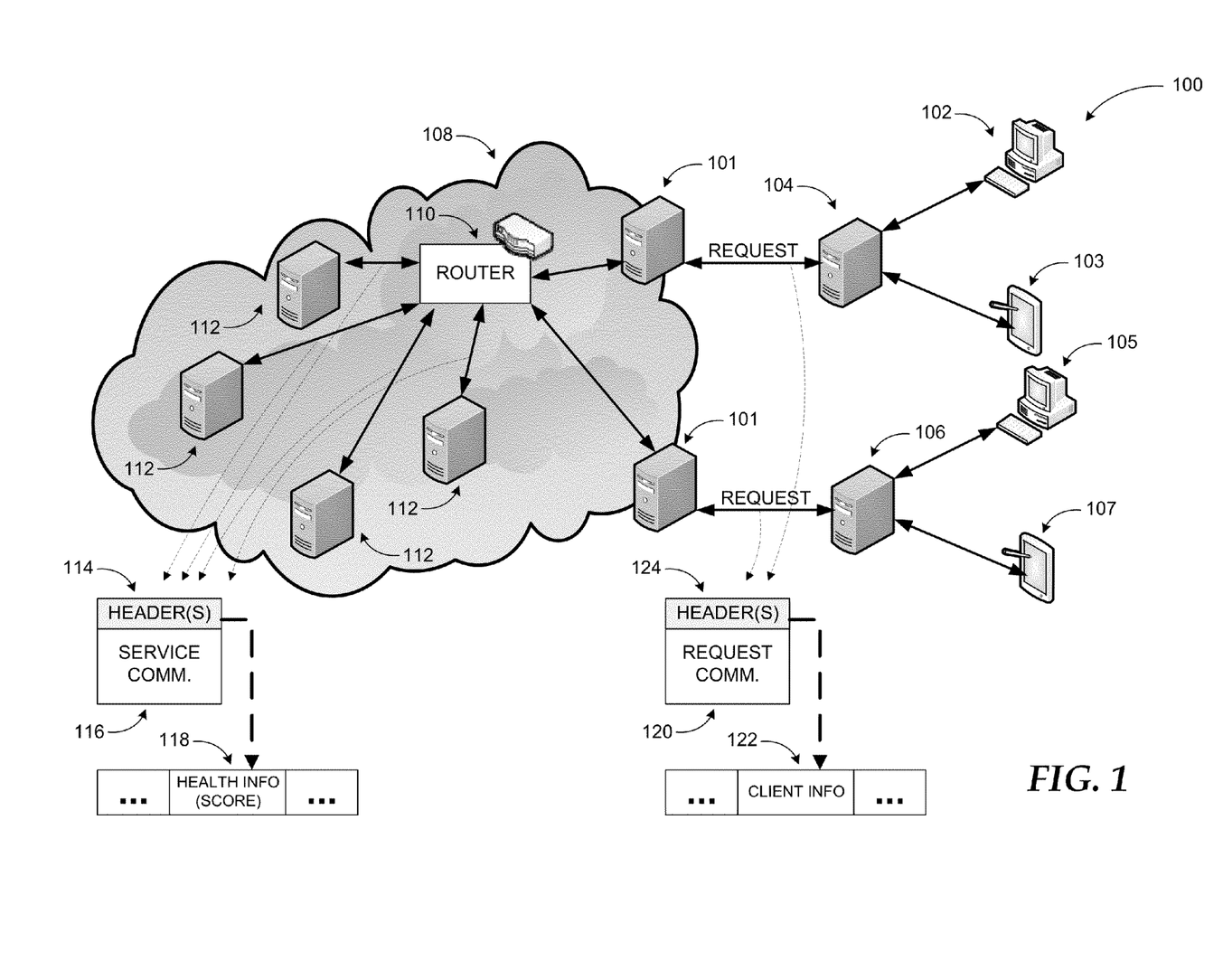
FIG. 1 illustrates an example network diagram, where server health and client information may be exchanged through service communication headers/request headers between a request management entity and servers/clients according to some embodiments.

Referring to FIG. 1, diagram 100 illustrates an example network diagram, where server health and client information may be exchanged through service communication headers/request headers between a request management entity and servers/clients according to some embodiments. The components and environments shown in diagram 100 are for illustration purposes. Embodiments may be implemented in various local, networked, cloud-based and similar computing environments employing a variety of computing devices and systems, hardware and software.

In an example environment illustrated in diagram 100, servers 112 may be part of a server farm or similar infrastructure (e.g. cloud 108) providing one or more hosted services to users accessing the services through client applications (e.g., browsers) executed on client devices 102, 103, 105, and 107, for example. Servers 104 and 106 may receive requests from respective client applications and forward those to request management servers 101 configured to route the requests to proper servers.

In an example scenario, a collaboration service such as Sharepoint® by Microsoft Corporation of Redmond, Wash. may be provided as the service. The collaboration service may enable storage, sharing, and editing of documents of various types, among other things. Thus, a user may access the collaboration service through a browser on their client device view a document, edit the document, and save it at its server location. These actions may be facilitated through requests submitted by the browser to the server 104 or 106 and routed by the request management servers 101. A system according to embodiments may include any number of request management servers in a scalable architecture. Different servers in the cloud 108 may be responsible for different aspects of the service. For example, one server may be responsible for storage of certain types of documents, while another may be responsible for facilitating the editing functionality. In addition, multiple servers may be responsible for the same task to provide capacity, redundancy, etc. Request management servers 104 and 106 may send a request through router 110 to a proper server based on that server's availability, health status, request type, client type and so on. In some embodiments, the routing, throttling, and/or load balancing functionality may be integrated into the router 110 instead of request management servers 104 and 106.

In deciding which server to send a request to, request management server may take into account, as discussed above, server health status, client type, and/or request type. The server health status may be provided to the request management servers 101 by the individual servers in form of a score or more detailed information (118) in headers 114 of service communications 116 as part of the regular communication exchange between the request management servers 101 and the servers 112. As part of the routine operations, the servers 112 and other components of the service may exchange service communications 116 periodically or on-demand. The service communications 116 may include headers 114. Examples of headers, depending on communication type may include HTTP headers, Sharepoint headers, etc. In an example system, each server may determine its health status (e.g., processor capacity, memory capacity, bandwidth, current load, etc.) and transmit the health status to the request management servers 101.

The health information 118 or score may be customizable by an administrator. For example, the health status may be a single score, multiple scores (for groups or each of the health metrics), or more detailed information (health metric value). The information may be sent to the request management servers 101 in the headers. The request management servers 101 (or router 110) may take the health information into account in deciding whether to block or forward a request, which server to route the request to, and how to perform load balancing.

Similarly to the exchange of server health status information via the headers, the request management servers 101 may receive client information 122 via the headers 124 of request communication 120 from the client devices 102, 103, 105, and 107. The client information may identify a client type such as a bot, a real user, a client associated with a particular tenant of the server farm, a version of the service associated with a client application submitting the request, and similar information. The client information may further identify a request type, which may lead the request management servers 101 to determine what type and amount of resources are involved in handling the request. Thus, request management servers 101 may use the client information in deciding which servers to send the request to, whether or not to throttle the request, and if and how to load balance the request.

The request management servers (one or more request management applications or modules executed at those servers) may make smart routing decisions based on routing rules that relate the nature of requests to the dynamic topology of the server farm. The request management servers may maintain and analyze the decisions and consequences for automatic and/or manual optimization. One or more rules that are interpreted and/or a customizable script may be used to make the routing, throttling, load balancing decisions. According to some embodiments, the request management servers 101 and/or the router 110 may be implemented as software, hardware, or a combination of software and hardware.

Figure 2:
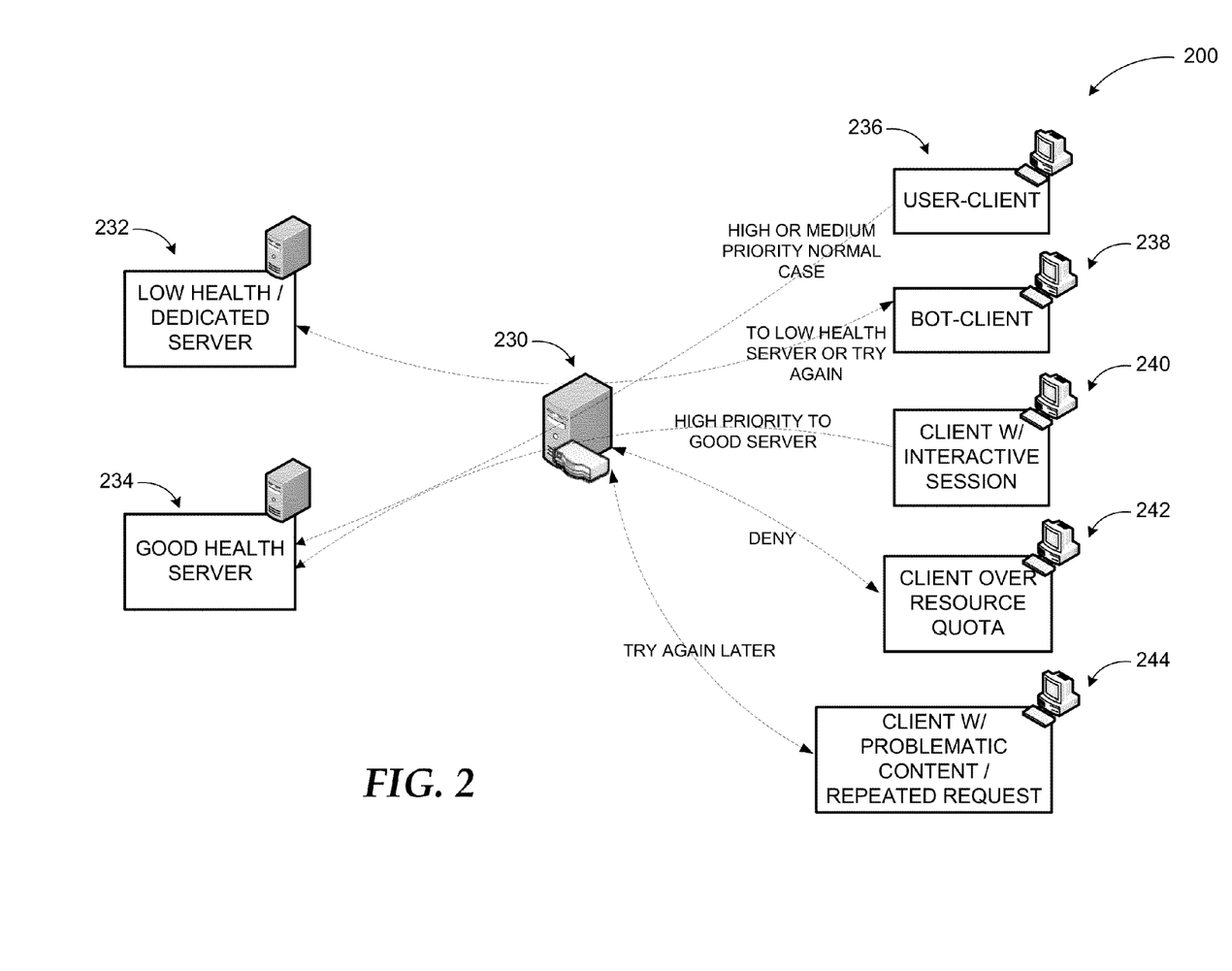
FIG. 2 illustrates example management of client requests in a system according to some embodiments.

FIG. 2 illustrates example management of client requests in a system according to some embodiments. Diagram 200 displays conceptually several example scenarios of request management. For example, a request from a user 236 (e.g., as opposed to a bot) may be a normal case and assigned high priority by a request manager 230 being assigned to a server 234 in good health. A request from a bot client 238 may be assigned a lower priority and sent to a low health (or dedicated) server 232 or rejected for retry since bots can easily retry requests without data loss or performance degradation. In a further example, a client with an interactive session (e.g., a browser) may be assigned high priority and sent to the server 234 with good health because any delays may be easily detected by the user and degrade user experience. In yet another example, requests from a client 242 who has exceeded their resource quota may be denied. Similarly, problematic requests 244 (e.g., requests associated with an overuse of resources, unsafe requests, or requests of unknown origin) may be denied or rejected for retrial later.

Following is an example scenario: There may be a heavy load on a system with many end-user browser requests. Notebook synchronization requests may start coming from a note taking web application. An administrator may realize these requests may adversely affect the browser requests, and add a throttling rule to deny the note taking web application requests. On the next incoming note taking web application request, the request manager may evaluate the following:

Deny requests with UserAgent regex="Note Taking App 2010*"

Based on this rule, the request manager may deny the request. When the system load eases, the administrator may remove the throttling rule and allow the note taking requests again. Alternatively, the administrator may enter a time in the rule's expiration field to have it automatically deactivated. The ability to deny certain requests to allow resources for others may allow for greater reliability. High-priority requests, such as interactive requests from end-users, may be ensured enhanced service by reducing their need to compete for resources with lower-priority requests. In some embodiments, the rule may be automatically applied by the system and have a health threshold applied to it. In that case, as the server load increases and server health scores reach values close to the threshold or greater, the rule may be automatically applied and the note taking requests blocked.

In another example scenario, a new browser request may arrive for one version of the service, followed by a request for a newer version of the same service (multiple versions may be deployed at the same time for different clients/tenants). Routing rules may exist in the system to route requests for the older version to selected servers in one farm and to route requests for the newer version to other selected servers in another farm (or the same farm). The request manager may evaluate the following:

Route requests with URL regex="service_version1*" to farm 1, WFE1-WFE3

Route requests with URL regex="service_version2*" to farm 2, WFE2-WFE4

Based on these rules, the request manager may route the first request randomly among WFE1-WFE3 servers in farm 1, and may route the second request randomly among WFE2-WFE4 servers in farm 2. The ability to separate requests in this manner may allow for easier manageability and capacity planning. One of the farms may be provisioned with needed resources/configurations to serve the older version requests, while the other farm may be similarly provisioned for serving the newer version requests. In some embodiments, health status weighted routing may be employed instead of random routing.

In a further example scenario, a series of new requests may arrive. One server in the farm may be in poor health, while two others may be in good health. The request manager may evaluate the following:

Health information: {[WFE1, sick], [WFE2, healthy], [WFE3, healthy]}

Based on this information, the request manager may route the requests splitting them among WFE2 and WFE3, rather than further burdening the sick WFE1. Alternatively, the administrator may remove WFE1 from the routing pool, allowing it to complete the processing of its current requests and return to a healthy state. The ability to make routing decisions based on health may allow for greater reliability.

In some embodiments, weighted routing may be implemented. The health aspect may come in the way that the weights are set. A policy engine mechanism may analyze server health data and update the weights correspondingly and dynamically. Thus a system may employ rules or a script to make optimized routing decisions; throttle or prioritize to prevent harmful requests from entering the service and prioritize different request types; and maintain a record of why routing decisions are made as well as the outcome of the decision (success/response time, failure/reason) for optimization and allow automatic and manual customization.

Figure 3:
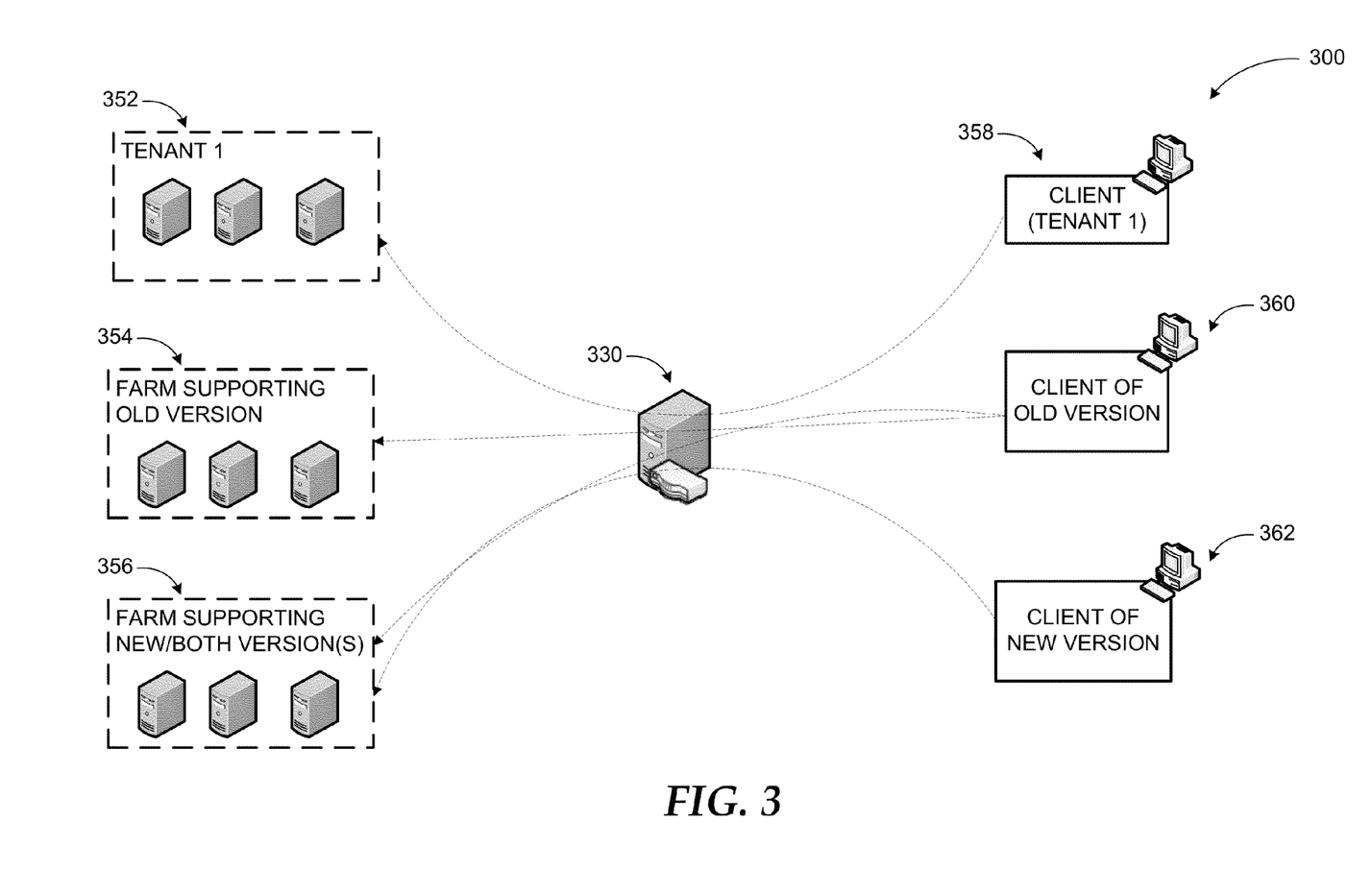
FIG. 3 illustrates example management of further client requests in a system according to other embodiments.

FIG. 3 illustrates example management of further client requests in a system according to other embodiments. Diagram 300 shows three additional example scenarios. According to a first scenario, client 358 of tenant 1 may submit a request to request manager 330 of a server farm hosting multiple tenants. Thus, the request may be forwarded to a server associated with tenant 1 (352) in the farm. In addition, the request manager may be associated with two different farms with one of the farms (354) supporting an old version of the service and the other of the farms (356) supporting both the old and the new versions of the service. A request coming from a client 360 for the old version may be sent to the farm 354 or the farm 356, while a request from a client 362 for the new version may be sent to the farm 356 only.

Following table includes further illustrative example scenarios. These and the above-discussed scenarios are intended for illustration purposes and do not constitute a limitation on embodiments.

TABLE 1

Example request managment scenarios

| Priority | Example Request Type | Example Behavior |
|---|---|---|
| 1 | Periodic (e.g. bot) | Try again later/route to dedicated server |
| 1 | Unserviceable (service down, out of resources) | Try again later |
| 1 | From tenant 1 | Route to one of tenant 1's machines |
| 1 | Interactive session (e.g. browser) | Respond as quickly as possible |
| 2 | From user | Route to machine in good health (normal case) |
| 2 | Problematic build/content | Deny |
| 2 | Twentieth similar request in ten seconds | Deny |
| 2 | From older/newer build of service | Route to farms supporting specific build of service |
| 2 | From client that has exceeded a resource quota | Try again later |
| 3 | For site collection 2 | Route to machine with site collection 2's data cached |
| 3 | Read-only (or static files) | Route to machine optimized for data retrieval/caching |
| 3 | Web application component request | Route to machine with web application component app cached |
| 3 | From user, second time | Route to same machine, where the user's info is cached |
| 4 | Write | Route to machine optimized for data storage |
| 4 | For a service that is currently down | Route to DC where service is up |

TABLE 1-continued

Example request managment scenarios

| Priority | Example Request Type | Example Behavior |
|---|---|---|
| 4 | Asynchronous OK | Queue request and service when possible |
| 4 | Previously failed/slow | Normal action + replicate and route to debug farm |

Routing, throttling, and load balancing of requests based on server health information and client information through rules or a script may be application intelligent according to embodiments. For example, different request types or client types may be assigned different priorities and the requests routed/throttled/load balanced according the application type. A request in a productivity service may be handled differently compared to a similar request in a data storage service or a data analysis service, for example.

Figure 4:
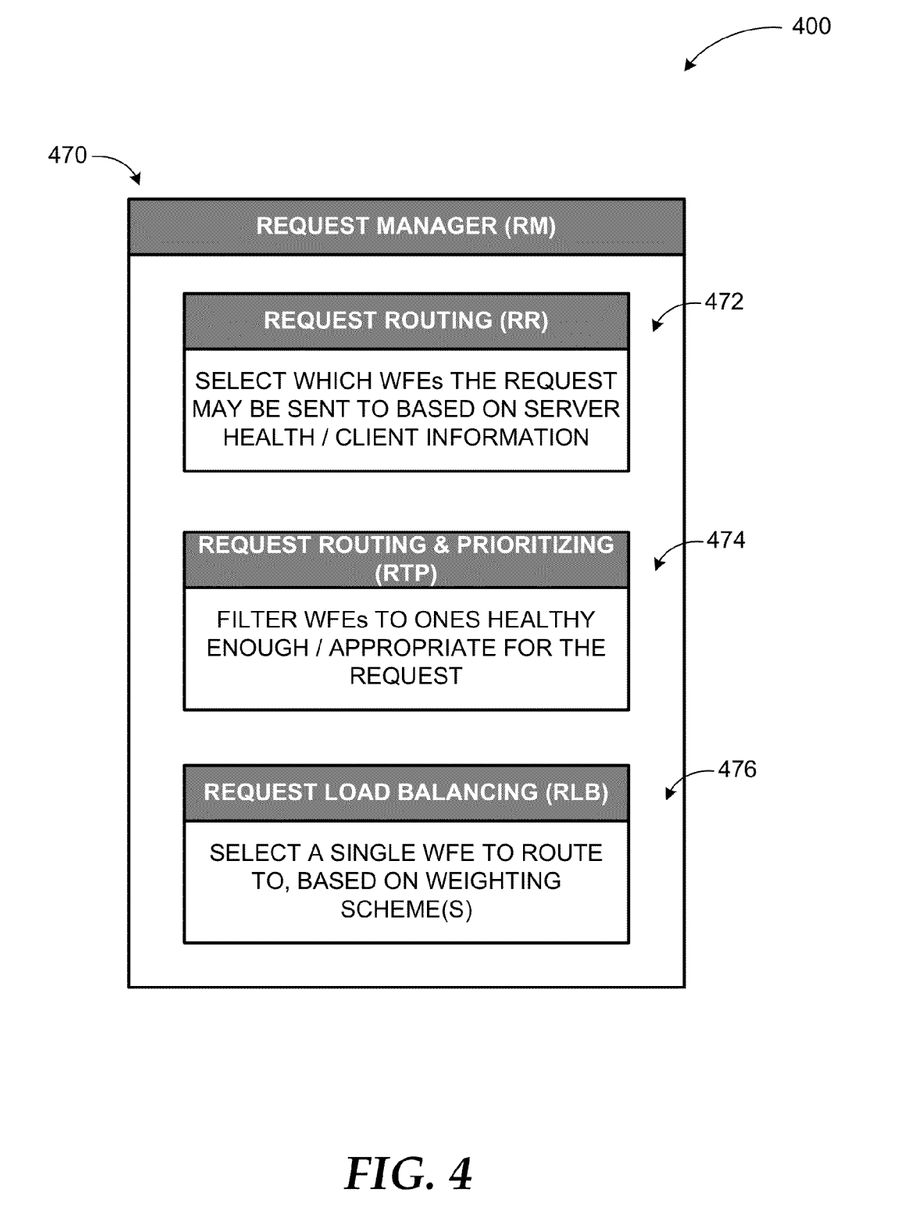
FIG. 4 illustrates a functional breakdown of a request manager according to embodiments.

FIG. 4 illustrates a functional breakdown of a request manager according to embodiments. Diagram 400 displays a Request Manager (RM) 470, whose task is to decide whether a request may be allowed into the service, and if so, to which server the request may be sent. These two decisions may be made by the three major functional parts of RM 470, Request Routing (RR) 472, Request Throttling and Prioritizing (RTP) 474, and Request Load Balancing (RLB) 476. In some embodiments, RM 470 may perform request management on a per-web-application basis.

RR 472 may select a server to send the request to randomly if there are no rules or no script executed in the system. If rules exist or a script is executed, RR 472 may apply the rules, for example, as shown in table 1. There may be many routing rules in the system, but not all of them may necessarily apply to every request. Thus, RR 472 may determine which rules match a given request through request-rule matching. Each rule may have one or more match criteria, which may include: a match property, a match type, and a match value. Match properties may include hostname, Uniform Resource Locator (URL), IP address, user agent, port, Hypertext Transport Protocol (HTTP) method, other headers, etc. Match types may include criteria such as "equals", "contains", "starts with", etc. The match logic may look like:

If ([match property] [match type] [match value]) then route to [servers]

An example match statement may look like:

If ([UserAgent] [Contains] ["NoteTaking_App_2010"]) then route to [WFE1]

In addition to request_rule matching, RR472 may also perform server selection. Server selection may use all routing rules, whether they match or do not match a given request. Rules that match entail the request may be sent to one of the servers in their machine sets. Rules that do not match entail the request may not be sent to any of the servers in their machine sets.

RTP 474 may filter the routing pool to servers that are healthy enough to process requests. If RR 472 is enabled, the routing pool may be the servers selected by RR 472. If RR 472 is disabled, the routing pool may be a current server. RTP 474 may, in the latter case, decide whether its own server is healthy enough to process the request. Similar to RR 472, RTP 474 may be broken down into two parts: request-rule matching and server filtering. Request_rule matching may be performed similarly to RR 472.

In server filtering, the RTP 474 may use a health threshold parameter from the throttling rules in combination with ambient server health data to determine if the servers in the selected routing pool can process the given request. The RTP 474 may first determine whether the routing pool is either the current server or comprises one or more servers selected by RR 472. The RTP 474 may then check matching rules to find the smallest health threshold value. At the end of the filtering process, there may be zero, one, or multiple servers in the routing pool. If there are no servers, then the health of the servers combined with the administrator's throttling rule set may have determined that no server can currently process the request, and an appropriate error page may be returned to the client.

After RR 472 and RTP 474 are executed, multiple routing targets may still be available for the request to be sent. RLB 476 may select a single target to which to send the request. The target may be selected using the routing weight schemes described previously or similar approaches. In an example embodiment the routing targets may begin with a weight of 1. If static weighting is turned on, the weights may be adjusted using the static weights set of each routing target. If health weighting is turned on, the weights may be further adjusted using health information to add weight to healthier targets and remove weight from less healthy targets. If client (client type, request type) is also used in the decision making process, further weighting based on that information may be applied. Once the routing target weights are adjusted using the enabled routing weight schemes, they may be used to select a single target at weighted-random.

When enabled, a throttling component may match requests against a set of throttling rules which specify thresholds on which to start throttling. The threshold may be in the form of server health. For all matching throttling rules, if the server health value is higher than the threshold of the rule, the server may be removed from the list. In the case where routing is not enabled but throttling is enabled, a current server may be used as the list of servers. At the end of the throttling component, if the server list is empty then a throttle page may be sent to the client.

Figure 5:
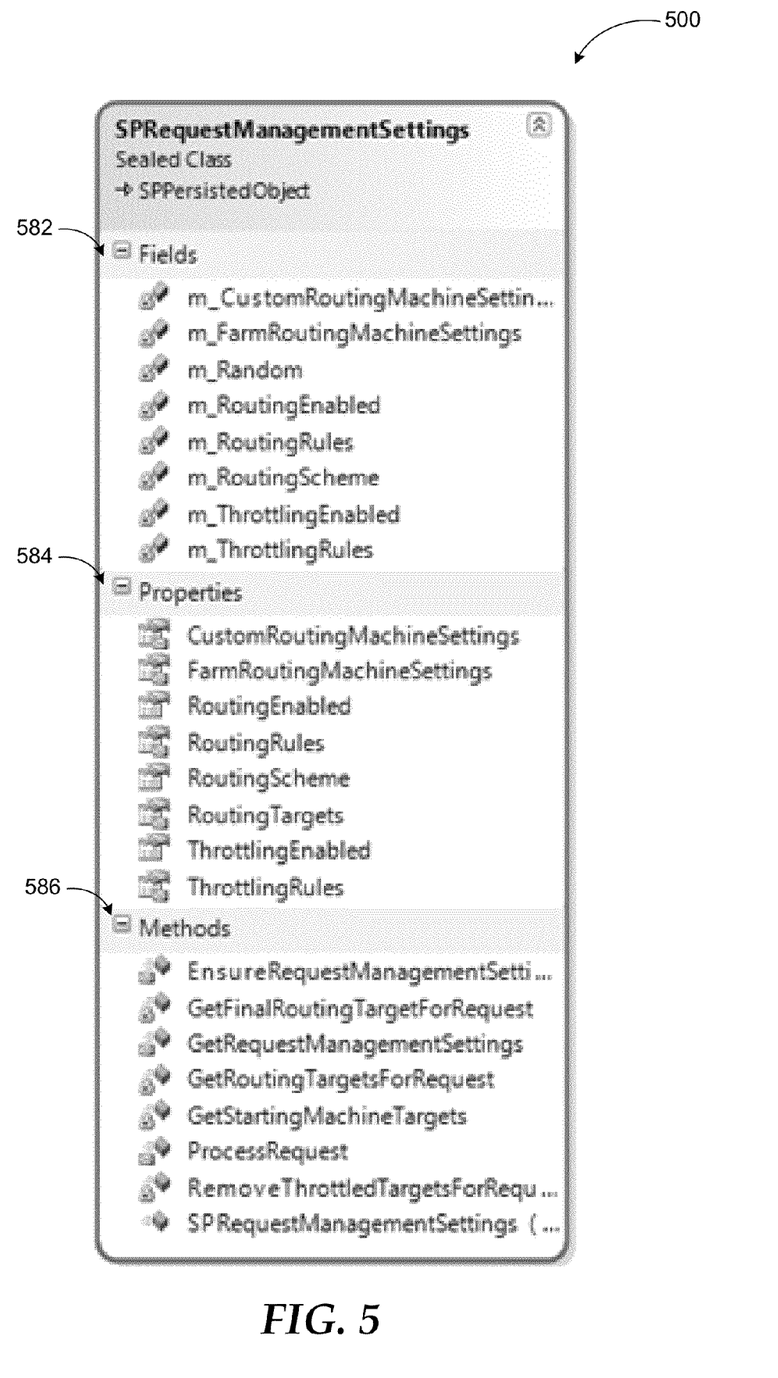
FIG. 5 illustrates an example request management settings object according to some embodiments.

FIG. 5 illustrates an example request management settings object according to some embodiments.

In a system according to embodiments, the routing and throttling components may be configured per web application during its creation. The components may be executed prior to other application code. Configuration information for the request management may include a list of servers (default and custom), a routing state (enabled/disabled), a throttling state (enabled/disabled), routing rules, and throttling rules. Following is an example multi-step technique:

Step 0: Determine if Routing is to be Performed

The starting point of the routing component may be to determine if routing is to be performed. This may be checked by looking at the configuration to see if routing is enabled. If not, no further steps may be taken. Next, the routing component may check for a custom header identifying previous routing evaluation. This header may be inserted by the routing component in the last step, and identify the farm which evaluated routing.

Step 1: Starting Server Set

A list of the servers, which may be used for routing, may be retrieved using the configuration settings for routing. The request manager may keep track of two sets of servers. The first may be the farm's servers, which may be automatically filled. The administrator may set the availability of these servers using the management component. The second set of servers maintained by the request management component may be custom servers specified by administrator. The working sets of servers may be those from the two lists, which are available as defined by the availability setting per server.

Step 2: Evaluating Routing Rules

This step may look at the request headers and evaluate the routing rules. The routing rules may be locally cached for each web application that has routing enabled. When evaluating a request, the logic may use the locally cached rules in some embodiments. Each rule may be evaluated against the request. For each rule, each MatchProperty in the routing rules Criteria may determine which header value to match against. The MatchValue (and MatchType) may be used to determine if a particular rule matches the request by running the regular expression, or match type comparison, against the property value. Every Match may evaluate to true against the request for the rule to apply. If the rule matches, each server in the rule may be selected from the server set found in Step 1. If the rule does not match, each server in the rule may be removed from the server set found in Step 1, as long as no matching rule contains the server. If there are matching rules, the list of routing targets may be the servers selected by those rules. If there are no matching rules, the list of routing targets may be the servers that were not removed by the rules. If there are no servers left after Step 2, an error page may be returned to the client.

Step 3: Evaluate Throttling

The routing targets determined in Step 2 may be used as an input to the throttling component. The return value may be a new list which has throttled servers removed.

Step 4: Route Request

The final step of routing may be to pass the request to a new server to handle it. In order to notify the final target that routing has already been performed, a custom header may be added to the request specifying which farm evaluated the routing. This way, a single server in a farm may handle the routing. A health status of each server in the routing targets list may be used to do weighted load balancing. In order to route the request to the final target, once determined, a new request may be created. The incoming request may be copied to this new request including values such as: headers, cookies, request body, etc. The response from the server may be copied to the outgoing stream. Again, this may include values such as: headers, cookies, and response body, etc.

The above-described technique is for illustration purposes and is not intended to constitute a limitation on embodiments. Routing/throttling requests in a system according to embodiments may be implemented with additional or fewer steps and in other orders of operations.

Diagram 500 shows an example request management settings object with specific example elements of configuration grouped under fields 582, properties 584, and methods 586. A settings object may include additional or fewer elements depending on system configuration, application types, server types, and other aspects.

Figure 6:
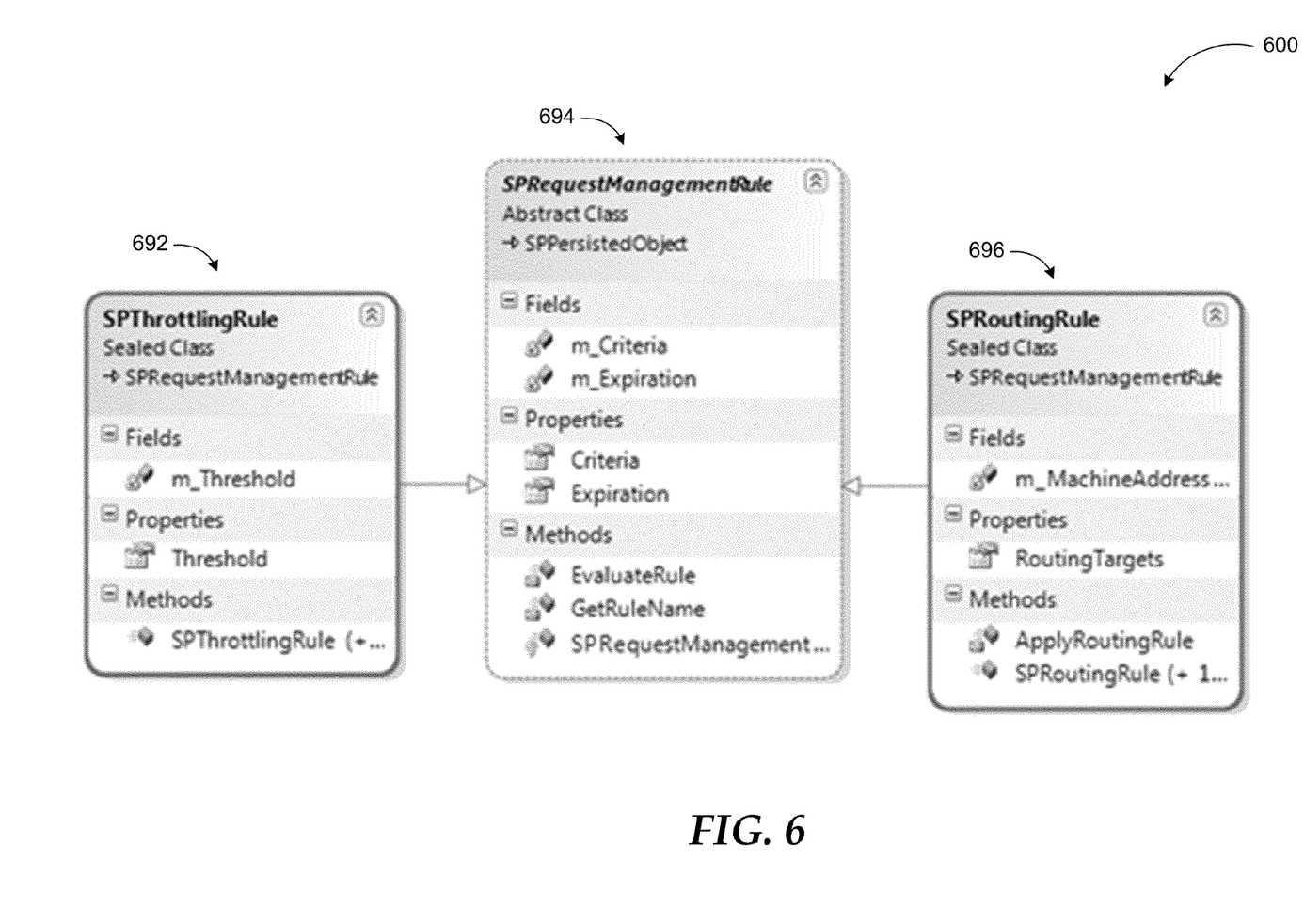
FIG. 6 illustrates example request management rules and their management according to some embodiments.

FIG. 6 illustrates example request management rules and their management according to some embodiments.

Each throttling rule may include the information needed to validate the rule, match against an incoming request, and specify the threshold to use for throttling. As described above, the routing and throttling may be performed as part of the web applications execution. Throttling for a web application may be performed after routing for the web application. Following is an example multi-step throttling technique:

Step 0: Determine if Throttling is to be Performed

The starting point of the throttling component may be to determine if throttling is to be performed. This may be checked by looking at the configuration to see if throttling is enabled. If not, no further steps may be taken.

Step 1: Determine Throttling Targets

The throttling targets may be determined by the routing component. If this is not enabled, the current server may be used as the target.

Step 2: Evaluate Throttling Rules

The next step may check the request headers and evaluate each throttling rules. The throttling rules may be locally cached for each web application that has throttling enabled. When evaluating a request, the logic may use the locally cached rules. Each rule may be evaluated against the request. Each MatchProperty in the routing rules may determine which header value to match against. The MatchValue (and MatchType) may be used to determine if a particular rule matches the request by running the regular expression, or match type comparison, against the property value.

Every Match may evaluate to true against the request for the rule to apply. If the rule matches, any server in the throttling targets that has a higher health score than the rule's threshold value may be removed. If there are no servers left after Step 2, a throttle page may be returned to the client. The resulting server list may be returned to the routing component.

Diagram 600 shows an example throttling rule object 692 and an example routing rule object 696 feeding into an example request management rule object 694 with the above-discussed elements such as throttling threshold, routing targets, throttling rules, routing rules, criteria, expiration, and so on.

The example scenarios and schemas in FIGS. 1 through 5 are shown with specific components, communication protocols, data types, and configurations. Embodiments are not limited to systems according to these example configurations. Other protocols, configurations, headers, and so on may be employed in implementing application intelligent request management based on server health and client information using the principles described herein.

Figure 7:
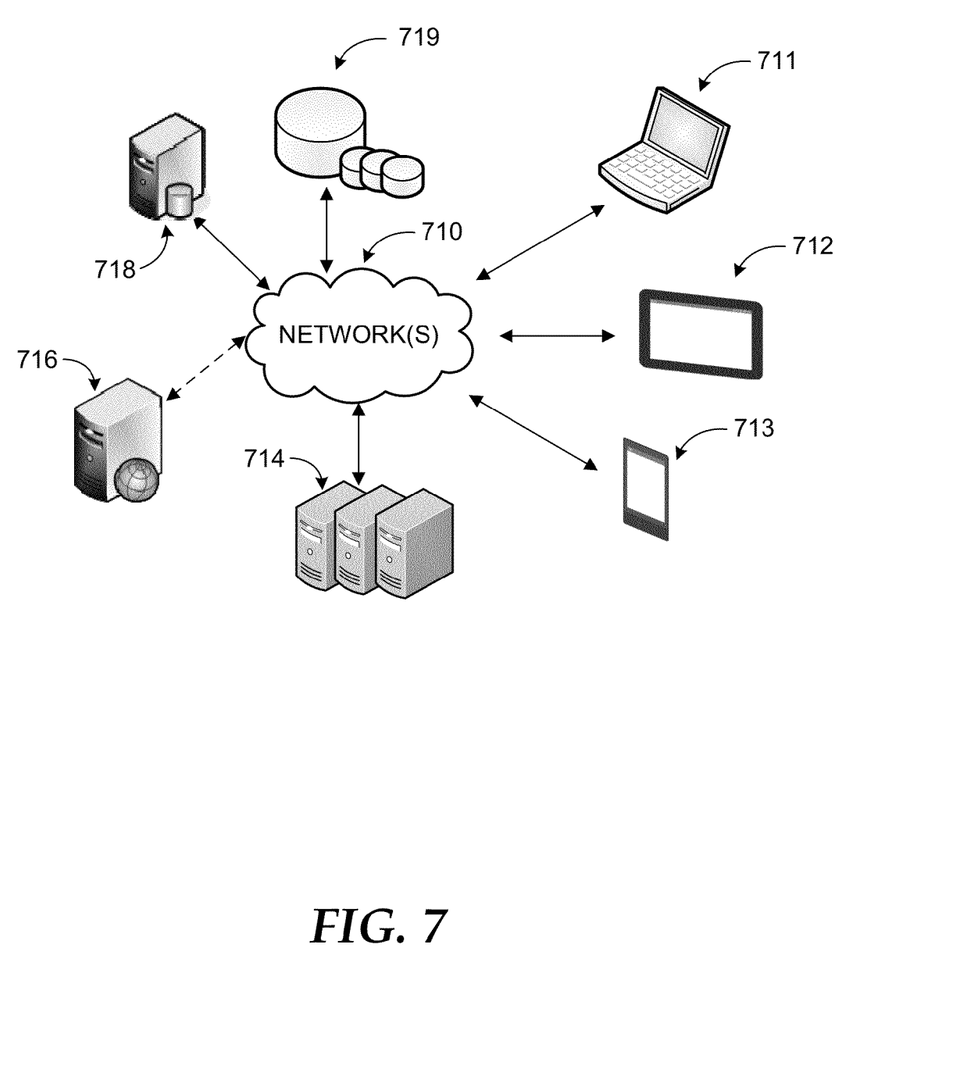
FIG. 7 is a networked environment, where a system according to embodiments may be implemented.

FIG. 7 is a networked environment, where a system according to embodiments may be implemented. Local and remote resources may be provided by one or more servers 714 or a single server (e.g. web server) 716 such as a hosted service. An application intelligent request management application may be executed on a management server (e.g., one or more of servers 714) accepting/rejecting/directing requests from client application on individual computing devices such as a smart phone 713, a tablet device 712, or a laptop computer 711 ('client devices') to proper servers (e.g., database server 718) through network(s) 710.

As discussed above, server health and client information may be exchanged through headers for request management. Routing/throttling decisions may be made based on rules or a script using application-aware decision process(es). Client devices 711-713 may enable access to applications executed on remote server(s) (e.g. one of servers 714) as discussed previously. The server(s) may retrieve or store relevant data from/to data store(s) 719 directly or through database server 718.

Network(s) 710 may comprise any topology of servers, clients, Internet service providers, and communication media. A system according to embodiments may have a static or dynamic topology. Network(s) 710 may include secure networks such as an enterprise network, an unsecure network such as a wireless open network, or the Internet. Network(s) 710 may also coordinate communication over other networks such as Public Switched Telephone Network (PSTN) or cellular networks. Furthermore, network(s) 710 may include short range wireless networks such as Bluetooth or similar ones. Network(s) 710 provide communication between the nodes described herein. By way of example, and not limitation, network(s) 710 may include wireless media such as acoustic, RF, infrared and other wireless media.

Many other configurations of computing devices, applications, data sources, and data distribution systems may be employed to implement application intelligent request management based on server health and client information. Furthermore, the networked environments discussed in FIG. 7 are for illustration purposes only. Embodiments are not limited to the example applications, modules, or processes.

Figure 8:
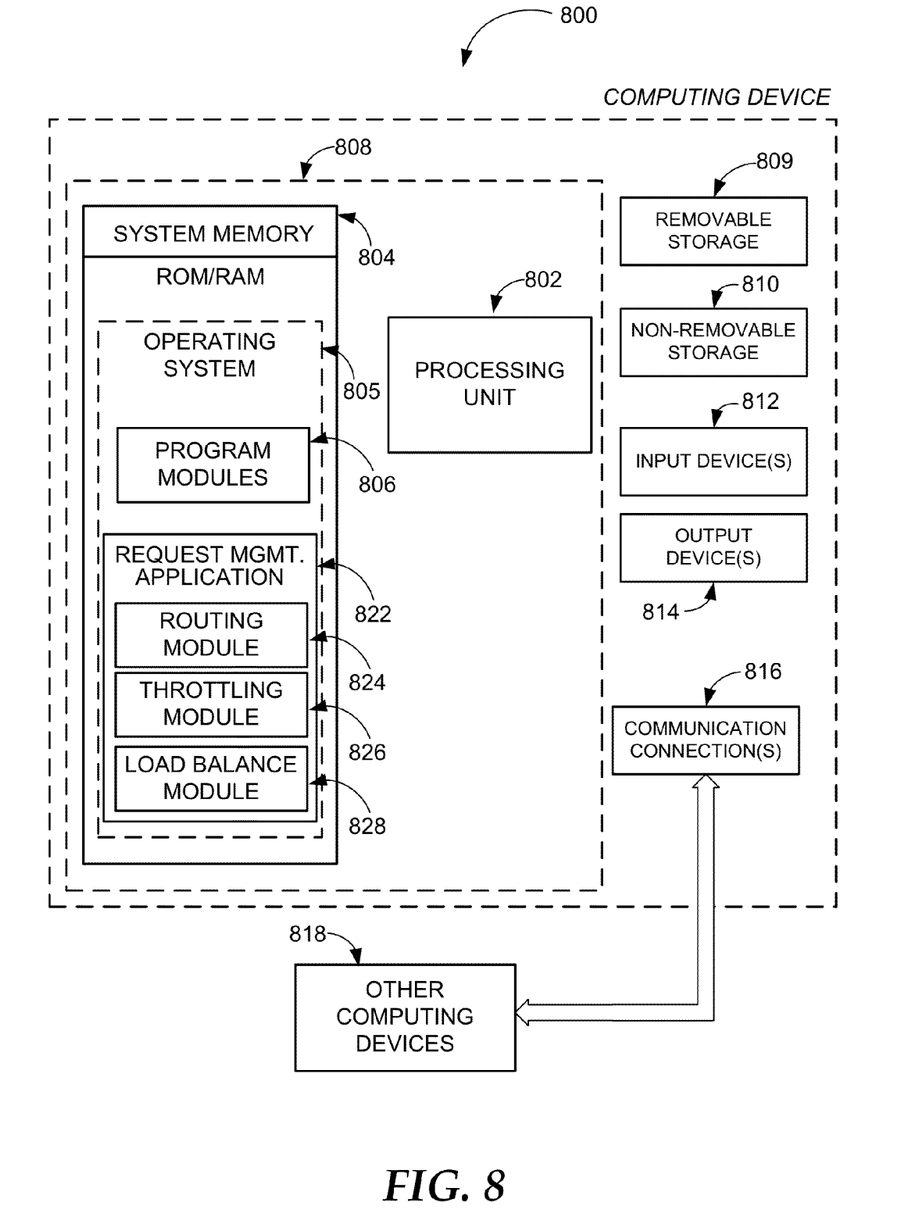
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® and WINDOWS PHONE® operating systems from MICROSOFT CORPORATION of Redmond, Wash. The system memory 804 may also include one or more software applications such as program modules 806, a request management application 822, a routing module 824, a throttling module 826, and a load balance module 828.

The request management application 822 may manage incoming requests including directing of requests to proper servers, maintenance of server status information, management of routing/throttling/load balancing rules and scripts according to embodiments. Different sub-tasks such as routing, throttling, and load balancing may be performed by distinct or integrated modules such as routing module 824, throttling module 826, and load balance module 828. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. Computer readable storage media is a computer readable memory device. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wireless network in a distributed computing environment, a satellite link, a cellular link, and comparable mechanisms. Other devices 818 may include computer device(s) that execute communication applications, storage servers, and comparable devices. Communication connection(s) 816 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 9:
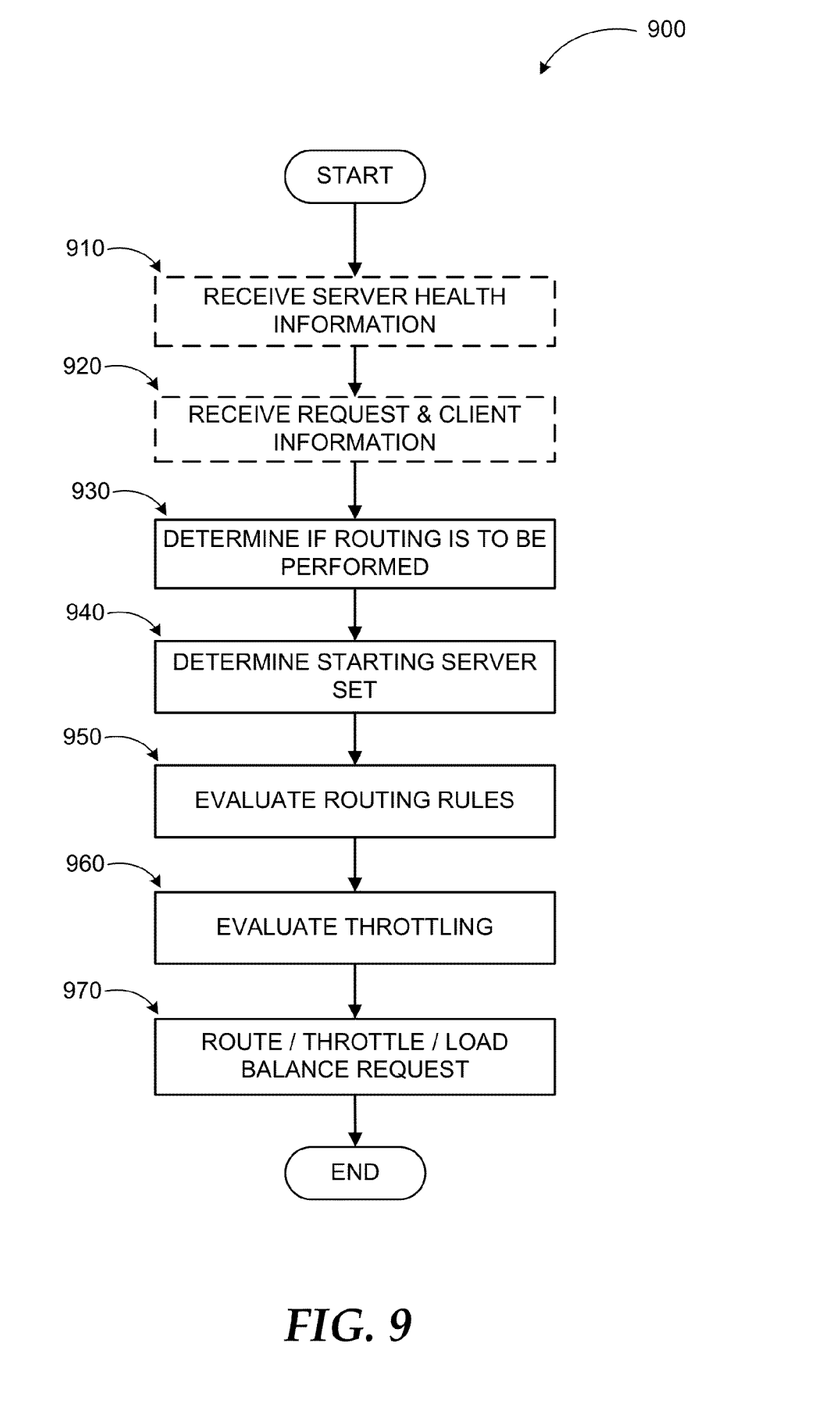
FIG. 9 illustrates a logic flow diagram for a process of application intelligent request management based on server health and client information according to embodiments.

FIG. 9 illustrates a logic flow diagram for a process of application intelligent request management based on server health and client information according to embodiments. Process 900 may be implemented by a request management application such as a router or throttler in a server farm management in some examples.

Process 900 may begin with optional operation 910, where server health information may be received in headers of service communications from servers in a service infrastructure as part of the regular system exchanges. At optional operation 920, a request may be received from a client along with client information (e.g., client type and/or request type).

At operation 930, a determination may be made if routing is to be performed by a request routing module followed by a determination of a starting server set at operation 940. At operation 950, request throttling and prioritizing module may evaluate routing rules (or execute a script) performing a request matching and server selection. At operation 960, throttling rules may be evaluated and a determination made whether the received request should be throttled or not. Results of the routing and throttling rule evaluations may be used at operation 970 to perform one or more of routing, throttling, and load balancing.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 900 are for illustration purposes. Application intelligent request management based on server health and client information according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for application intelligent request management based on server health and client information, the method comprising:
   receiving server health information from one or more servers in a service infrastructure in headers of service communication;
   receiving a request from a client, wherein the request includes client information in a header of the request;
   determining if routing is to be performed;
   if routing is to be performed, determining a starting server set;
   evaluating routing rules against the received request and the starting server set;
   determining if one or more servers pool are qualified to process the received request by:
      evaluating the matching rules to find a smallest health threshold value, and if a server health value is higher than the smallest threshold value of a matching rule, removing the server from a throttling pool;
      using a current server as the throttling pool if routing is not enabled but throttling is enabled; and
      if the throttling pool is empty, transmitting an error message to a client submitting the received request; and
   routing the request to a selected server based on a result of the evaluation.

2. The method of claim 1, wherein evaluating the routing rules comprises:
   determining one or more rules that match the received request; and
   filtering a routing pool to servers that meet a health status threshold based on received health information from the servers.

3. The method of claim 2, further comprising:
   extracting from each rule one or more match criteria, wherein the match criteria include: a match property, a match type, and a match value.

4. The method of claim 3, wherein the match property includes one of: a hostname, a Uniform Resource Locator (URL), an Internet Protocol (IP) address, a user agent, a port, a Hypertext Transport Protocol (HTTP) method, and a header, and the match type includes one of: "equals", "contains", and "starts with".

5. The method of claim 2, further comprising:
   filtering the routing pool by employing all routing rules regardless of matching the request, wherein rules that match entail the request to be sent to one of the servers in routing pool and rules that do not match entail the request not to be sent to any of the servers in the routing pool.

6. The method of claim 1, further comprising:
   determining if throttling is to be performed;
   determining one or more throttling target servers; and
   evaluating throttling rules.

7. The method of claim 6, wherein evaluating the throttling rules comprises:
   determining one or more throttling rules that match the received request; and
   employing a health threshold parameter from the matching throttling rules in combination with ambient server health data to determine if one or more servers in a selected routing pool are qualified to process the received request.

8. The method of claim 6, further comprising:
   if following throttling multiple routing target servers are available for the request to be sent, selecting a single target server employing a weighted routing weight scheme.

9. The method of claim 8, further comprising:
   if health weighting is enabled, adjusting weights based health information from the servers such that weight is added to healthier target servers and weight is removed from less healthy target servers.

10. The method of claim 8, further comprising:
    if client weighting is enabled, adjusting weights based client information from the client, wherein the client information is associated with one or more of a client type, a service version, a request type, and a request repetition.

11. A computing device for employing application intelligent request management based on server health and client information, the computing device comprising:
    a communication module configured to communicate with one or more servers in a service infrastructure and one or more clients;
    a memory configured to store instructions; and
    a processor coupled to the memory, the processor configured to execute a request management application in conjunction with the instructions stored in the memory, wherein the request management application is configured to:
    receive server health information from one or more servers in a service infrastructure in headers of service communication;
    receive a request from a client, wherein the request includes client information in a header of the request;
    determine if routing is to be performed;
    if routing is to be performed, determine a starting server set;
    evaluate routing rules against the received request and the starting server set;
    determine if throttling is to be performed;
    determine one or more throttling target servers;
    evaluate throttling rules;
    if the request is not throttled, route the request to a selected server employing weighted routing;
    if the request is a periodic request, one of routing the request to a dedicated server and responding with a "try again later" reply;
    if the request is an unserviceable request, responding with a "try again later" reply;
    if the request is a potentially harmful request, denying the request;
    if the request is associated with a predefined version of an application hosted by a server farm, routing the request to a server associated with the predefined version of the application; and
    if the request is a "Write" request, routing the request to a server optimized for data storage.

12. The computing device of claim 11, wherein the request management application is further configured to:

analyze the server health information; and update routing weights dynamically based on analysis results.

13. The computing device of claim 11, wherein the request management application is further configured to maintain a record of routing decisions and an outcome of each routing decision for optimization, the outcome comprising one or more of a success, a failure, a response time, and a failure reason.

14. The computing device of claim 11, wherein the request management application is further configured to execute a script to perform routing and throttling.

15. The computing device of claim 11, wherein the request management application is further configured to select a server to send the request to randomly if there are no routing and throttling rules available.

16. A computer-readable memory device with instructions stored thereon for application intelligent request management based on server health and client information, the instructions comprising:

receiving server health information from one or more servers in a service infrastructure in headers of service communication;

receiving a request from a client, wherein the request includes client information in a header of the request;

determining if routing is to be performed;

if routing is to be performed, determining a starting server set;

evaluating routing rules against the received request and the starting server set;

determining if throttling is to be performed;

determining one or more throttling target servers;

evaluating throttling rules;

if the request is not throttled, routing the request to a selected server employing weighted routing;

if the request is a periodic request, one of routing the request to a dedicated server and responding with a "try again later" reply;

if the request is an unserviceable request, responding with a "try again later" reply;

if the request is a potentially harmful request, denying the request;

if the request is associated with a predefined version of an application hosted by a server farm, routing the request to a server associated with the predefined version of the application; and if the request is a "Write" request, routing the request to a server optimized for data storage.

17. The computer-readable memory device of claim 16, wherein the instructions further comprise:

searching for a custom header identifying a previous routing evaluation; and inserting the custom header identifying a server farm that performs the evaluated routing to the request upon completion of the routing.

18. The computer-readable memory device of claim 16, wherein the instructions further comprise:

if the request is from a client associated with a tenant of a server farm, routing the request to a server within the server farm associated with the tenant;

if the request is from a user, routing the request to a server above a determined health threshold;

if the request is from a client in an interactive session, routing the request to a server above the determined health threshold with high priority; and if the request is from a client in excess of a client assigned resource quota, responding with a "try again later" reply.

\* \* \* \* \*